(12) United States Patent
Kim

(10) Patent No.: US 7,287,613 B2
(45) Date of Patent: Oct. 30, 2007

(54) CARRIER STRUCTURE

(75) Inventor: Myeong-ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 284 days.

(21) Appl. No.: 11/039,829

(22) Filed: Jan. 24, 2005

(65) Prior Publication Data

US 2005/0252704 A1    Nov. 17, 2005

(30) Foreign Application Priority Data

May 17, 2004    (KR) ............... 10-2004-0034790

(51) Int. Cl.
 *B60K 11/04* (2006.01)
(52) U.S. Cl. .................... 180/68.4; 180/68.6
(58) Field of Classification Search ............. 180/68.4, 180/68.1, 68.2, 68.3
See application file for complete search history.

(56) References Cited

U.S. PATENT DOCUMENTS

| | | | | |
|---|---|---|---|---|
| 5,409,288 A | * | 4/1995 | Masuda | 296/193.09 |
| 5,575,526 A | * | 11/1996 | Wycech | 296/205 |
| 5,658,041 A | * | 8/1997 | Girardot et al. | 296/193.09 |
| 5,884,960 A | * | 3/1999 | Wycech | 296/146.6 |
| 6,168,226 B1 | * | 1/2001 | Wycech | 296/146.6 |
| 6,196,624 B1 | * | 3/2001 | Bierjon et al. | 296/193.09 |
| 6,273,496 B1 | * | 8/2001 | Guyomard et al. | 296/193.09 |
| 6,405,788 B1 | * | 6/2002 | Balthazard | 165/67 |
| 6,412,855 B1 | * | 7/2002 | Cantineau et al. | 296/187.01 |
| 6,502,653 B1 | * | 1/2003 | Balzer et al. | 180/68.4 |
| 6,679,545 B1 | * | 1/2004 | Balzer et al. | 296/193.09 |
| 6,681,876 B1 | * | 1/2004 | Haneda et al. | 180/68.4 |
| 6,708,790 B2 | * | 3/2004 | Ozawa et al. | 180/68.4 |
| 6,715,573 B2 | * | 4/2004 | Emori et al. | 180/68.4 |
| 6,729,424 B2 | * | 5/2004 | Joutaki et al. | 180/68.4 |
| 6,796,604 B2 | * | 9/2004 | Igura et al. | 296/193.03 |
| 6,955,393 B2 | * | 10/2005 | Staargaard et al. | 296/193.1 |
| 7,117,926 B2 | * | 10/2006 | Mori et al. | 165/67 |
| 2005/0067896 A1 | | 3/2005 | Kim et al. | |
| 2006/0207815 A1 | * | 9/2006 | Vandekerkhof | 180/68.4 |

FOREIGN PATENT DOCUMENTS

| | | |
|---|---|---|
| JP | 11-139344 | 5/1999 |
| KR | 10-2004-0033489 | 4/2004 |
| KR | 10-2004-0036089 | 4/2004 |

OTHER PUBLICATIONS

English Language Abstract of JP 11-139344.
English Language Abstract of JP 10-2004-0036089.
English Language Abstract of JP 10-2004-0033489.
U.S. Appl. No. 10/973,342, to Lee, filed Oct. 27, 2004.

* cited by examiner

*Primary Examiner*—Jeff Restifo
(74) *Attorney, Agent, or Firm*—Greenblum & Bernstein, P.L.C.

(57) ABSTRACT

A carrier structure has an inside member formed of a plastic material, an outer member formed of steel coupled to the inside member, and a bracket formed at a lower end of the outer member for reducing the weight of the carrier. The bracket is coupled to the inner member at a portion for mounting a radiator by an over-molding method, thereby enhancing the mounting strength of a cooling system.

5 Claims, 4 Drawing Sheets

53   71         81

CARRIER STRUCTURE

RELATED APPLICATIONS

The present disclosure relates to subject matter contained in Korean Application No. 10-2004-34790, filed on May 17, 2004, which is herein expressly incorporated by reference its entirety.

BACKGROUND OF THE INVENTION

1. Field of the Invention

The present invention relates to a carrier structure, which has an inside member of a plastic material, an outer member made of steel coupled to the inside member, and a bracket formed at a lower end of the outer member for reducing the weight of the carrier, wherein the bracket is coupled to the inner member at a portion for mounting a radiator by an over-molding method, thereby enhancing the mounting strength for a cooling system.

2. Description of the Related Art

In general, a vehicle frame, defining the outer appearance of a vehicle, comprises a passenger cabin, an engine compartment, a trunk compartment, fenders, and the like. The vehicle frame is divided into a front vehicle frame, a central vehicle frame, and a rear vehicle frame, in a lengthwise direction of the vehicle.

The front vehicle frame is provided with a carrier, which has a headlamp, a radiator, a condenser, a bumper, and the like assembled thereto.

FIG. 1 is an exploded perspective view illustrating a carrier in a conventional vehicle, FIG. 2 is a perspective view illustrating the carrier of FIG. 1 in a coupled state, and FIG. 3 is a cross sectional view taken along line A-A of FIG. 2.

As shown in the drawings, as for a technology for integrally assembling the headlamp, the radiator, the condenser, the bumper, and the like to a frame panel of the vehicle in order to enhance assembly efficiency at a jobsite, and to reduce the number of components to be assembled, thereby ensuring precise assembly thereof, an FEM (front-end module) is applied to the carrier.

That is, the carrier 10 is a hybrid type, wherein an inner member 11 of plastic material and outer member 21 of steel are coupled to each other.

Here, the outer member 21 comprises an upper-end support 22, formed at an upper end thereof, a lateral support 23 formed at either side thereof, and a lower-end support 24, formed at a lower end thereof.

The inner member 11 is formed at a lower end of the inner member, with a mounting portion 12 having a coupling hole 13 for mounting a cooling system, such as a radiator 31. Reference numeral 32 denotes a bush.

Since the carrier must act as a damper of the cooling system when the engine is idling, it is necessary that it have sufficient stiffness and strength.

However, since the cooling system is mounted on the inner member made of the plastic material, there is a problem in that the stiffness and the strength are weak.

Furthermore, although the lower-end support made of steel can increase the weight of the carrier due to the material constituting the support, there is a problem in that the lower-end support does not contribute to coupling of the cooling system to the carrier.

SUMMARY OF THE INVENTION

The present invention has been made to solve the above problems, and it is an object of the present invention to provide a carrier, which removes a lower-end support of an outer member, thereby reducing the overall weight of the carrier, and which has brackets mounted on a lower end of the outer member, thereby enhancing stiffness of a portion to which a cooling system is coupled.

In accordance with an aspect of the present invention, the above and other objects can be accomplished by the provision of a carrier structure, comprising: an inner member made of plastic material and having a mounting portion protruded therefrom to define a coupling hole for mounting a cooling system at a lower end of the inner member; an upper-end support coupled to an upper portion of the inner member; a lateral support downwardly formed at either side of the upper-end support; and an outer member made of steel and including a bracket coupled to a lower end of the lateral support and to the mounting portion.

The carrier structure has the mounting portion and the bracket connected to the lower end of the outer member by over-molding, thereby not only strengthening the carrier on which a cooling system, such as a radiator, is mounted, but also reducing the overall weight of the carrier.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Figure 1:
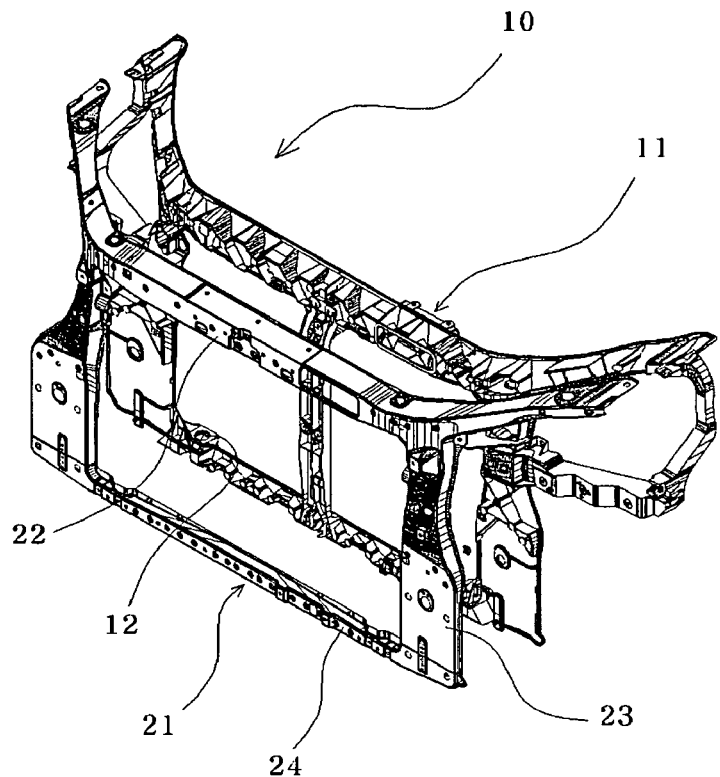
FIG. 1 is an exploded perspective view illustrating a carrier in a conventional automobile.
Figure 2:
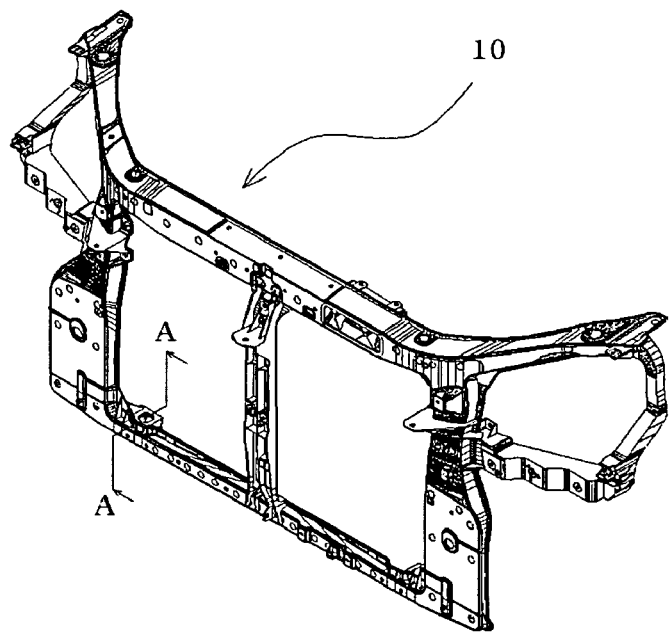
FIG. 2 is a perspective view illustrating the carrier of FIG. 1 in a coupled state.
Figure 3:
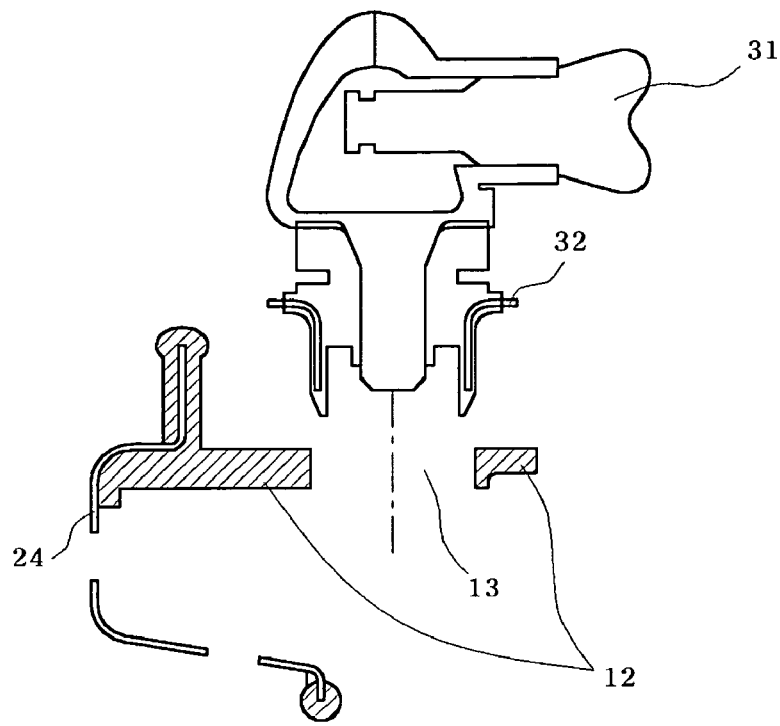
FIG. 3 is a cross sectional view taken along line A-A of FIG. 2.

Preferred embodiments will now be described in detail with reference to the accompanying drawings.

Further, in the following description, the present embodiments are disclosed for example only, and not to restrict the scope of the present invention. The same components as those of the conventional carrier will be denoted by the same reference numerals.

Figure 4:
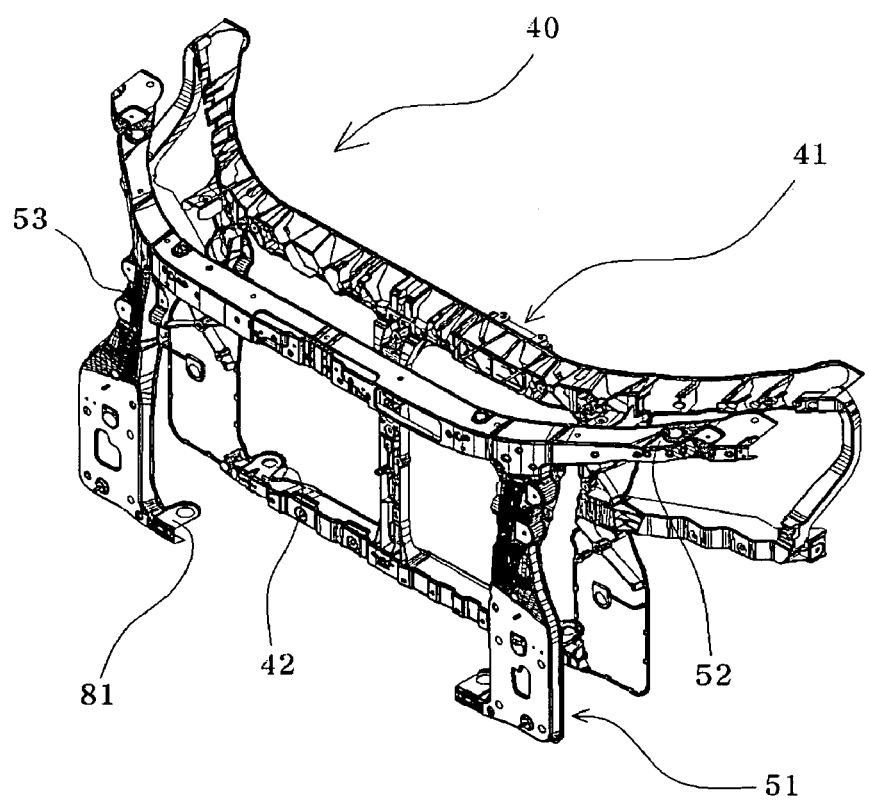
FIG. 4 is an exploded perspective view illustrating a carrier according to the present invention.
Figure 5:
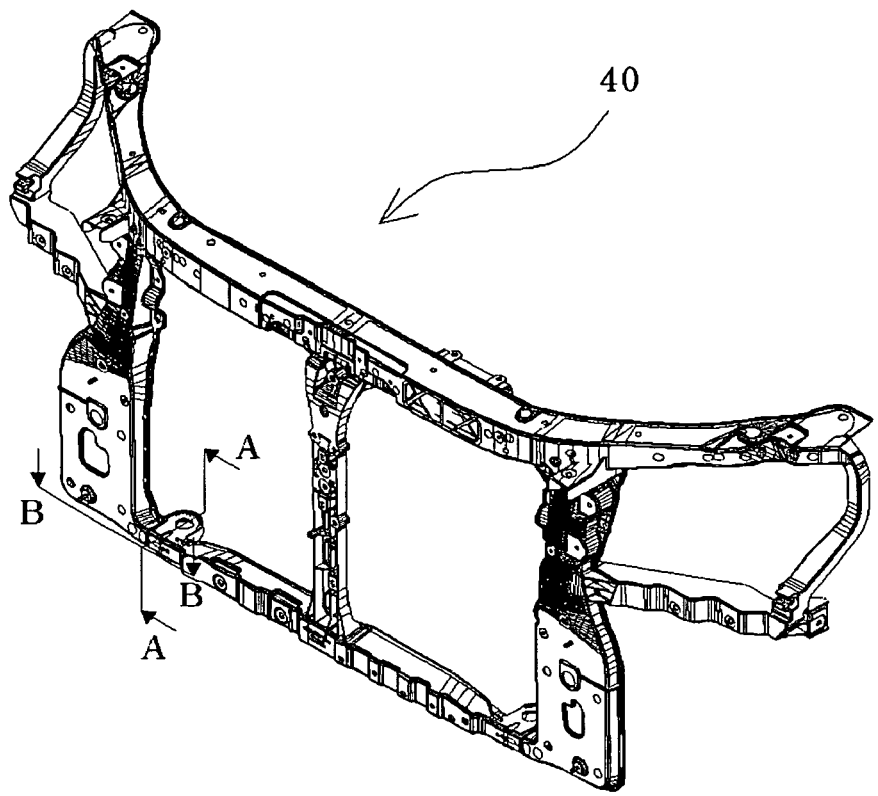
FIG. 5 is a perspective view illustrating the carrier of FIG. 4 in a coupled state.
Figure 6:
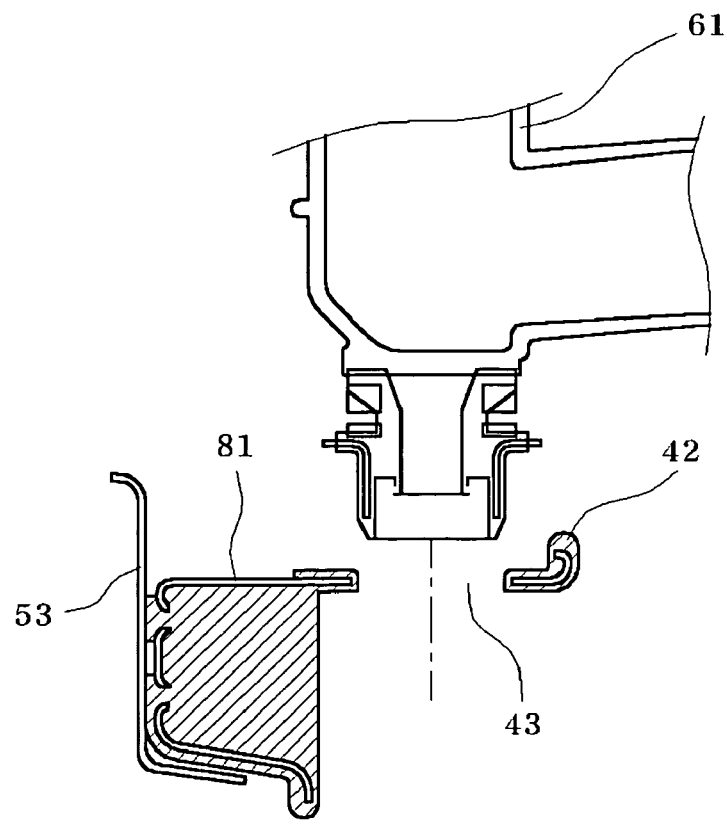
FIG. 6 is a cross sectional view taken along line B-B of FIG. 5.
Figure 7:
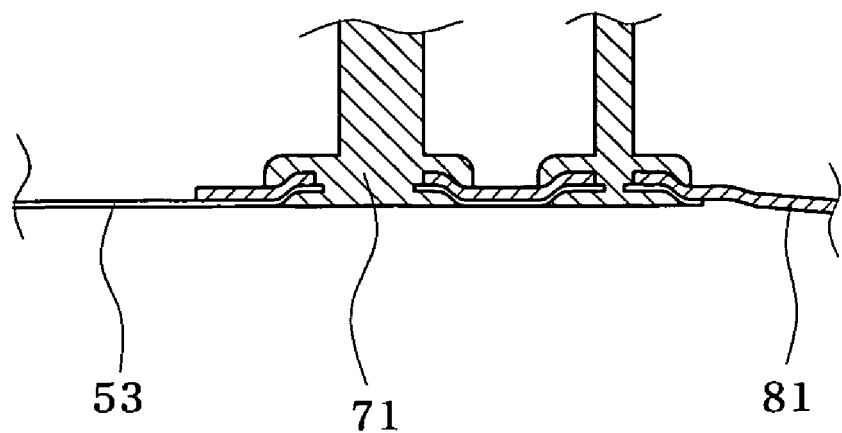
FIG. 7 is a cross sectional view taken along line B-B of FIG. 5.

FIG. 4 is an exploded perspective view illustrating a carrier according to the present invention, and FIG. 5 is a perspective view illustrating the carrier of FIG. 4 in a coupled state. FIG. 6 is a cross sectional view taken along line B-B of FIG. 5, and FIG. 7 is a cross sectional view taken along line B-B of FIG. 5.

As shown in the drawings, a carrier 40 according to the present invention has an inner member 41 made of plastic material and an outer member 51 made of steel, coupled to each other.

Here, the inner member 41 has a mounting portion 42, protruded at a lower end of the inner member 41, at which a coupling hole 43 for mounting a cooling system, such as a radiator 61, is defined.

The outer member 51 comprises an upper-end support 52 coupled to an upper end of the inner member 41, and a pair of lateral supports 53, each of which is downwardly formed from a lower surface of the upper-end support 52.

Here, each of the lateral supports 53 is mounted at a lower end thereof with a bracket 81, which is also coupled to the inner member 41.

That is, it is preferred that the bracket 81 and the mounting portion 42 are coupled to each other by an over-molding method in order to enhance the stiffness. FIGS. 5 and 6 show the bracket 81 and the mounting portion 42 coupled to each other by the over-molding method.

The said the over-molding method is a method for bonding between two adjacent steel members or for bonding between a plastic member and a steel member.

In the case of bonding between two adjacent steel members, the over-molding is carried out in a way that both members are bonded to each other by surrounding overall surfaces of both steel members with plastic material, and in the case of bonding between the plastic member and the steel member, the over-molding is carried out in a way that both materials are bonded to each other by surrounding the steel member at one side with the plastic member at the other side, thereby enhancing the bonding strength of the materials.

In accordance with the present invention, upon bonding between the mounting portion 42 of the inner member 41 formed of the plastic material and the bracket 81 made of the steel, the mounting portion 42 of the plastic material is formed to surround an outer peripheral surface of the bracket 81.

It is also preferred that the bracket 81 and the lateral supports 53 of the outer member 51 are coupled to each other by an in-mold assembly method. An in-mold assembly structure is shown in FIG. 7.

The in-mold assembly method is a method in which, after holes are formed through steel members overlapping each other or through a plastic member and a steel member overlapping each other, a plastic material is inserted into the holes of the steel members or into the holes of the plastic member and the steel member. In the present invention, after holes are commonly formed through the lateral supports 53 of the steel and the bracket 81 of the steel overlapping each other, in-mold assembly buttons 71 for the plastic material are inserted into the holes of the lateral supports 53 and the bracket 81 while surrounding the lateral supports 53 and the bracket 81, and fused to the lateral supports 53 and the bracket 81 in the holes, respectively, so that the lateral supports 53 and the bracket 81 are coupled to each other.

Figure 8:
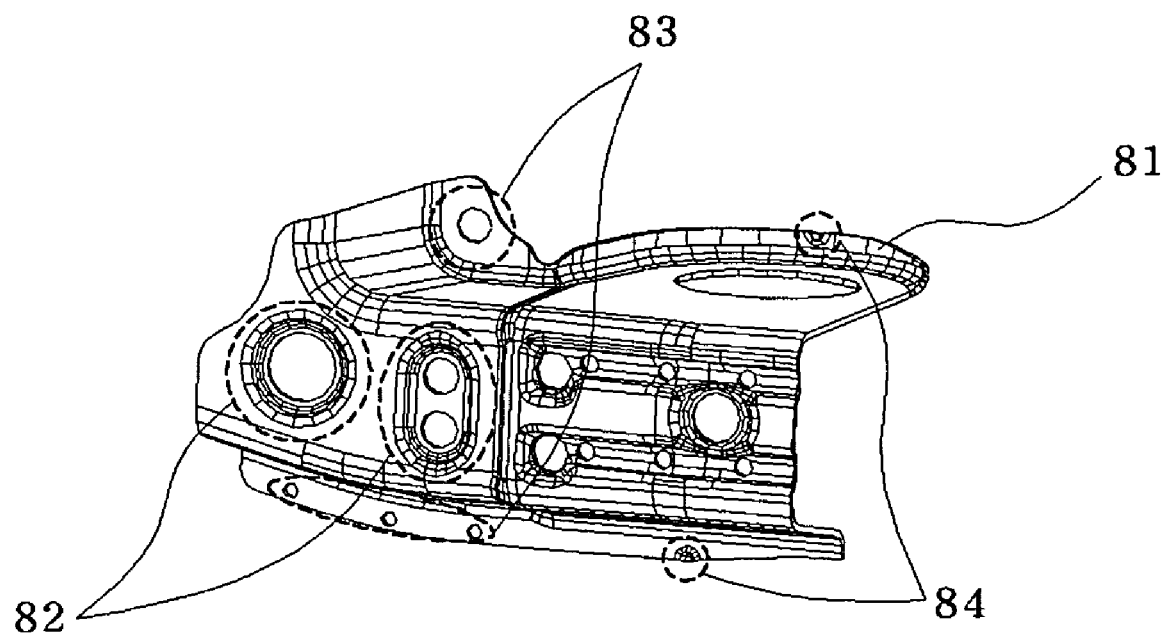
FIG. 8 is a diagram illustrating an embodiment of the present invention.

Meanwhile, in order to form the coupling structure as described above, the bracket 81 is formed with a plurality of openings. FIG. 8 shows one embodiment of the bracket according to the present invention.

In FIG. 8, reference numeral 82 denotes holes for coupling one component made of steel to another component made of steel, that is, holes for inserting the buttons for coupling the bracket 81 and the lateral support 53 by an in-mold assembly method.

Reference numeral 83 denotes holes for coupling one component made of steel to another component made of a plastic material, that is, holes for coupling the bracket 81 and the inner member 41. Here, the bracket 81 and the inner member 41 are over-molded through the hole 83.

Reference numeral 84 denotes bosses for coupling one component made of steel to another component made of the plastic material, that is, bosses for coupling the bracket 81 and the inner member 41.

Advantageous effects of the present invention having the structure as described above will be described, as follows.

The inner member 41 made of plastic material and the outer member 51 made of steel are coupled to each other, forming the carrier 40. The outer member 51 is mounted with the brackets 81.

Each of the brackets 81 is coupled to each of the lateral supports 53 by the in-mold assembly method, while being coupled to the mounting portion 42 by the over-molding method.

Accordingly, instead of using the lower-end support of the prior art, the brackets 81 are used in the carrier of the present invention, thereby reducing the weight of the carrier.

Furthermore, the brackets 81 are coupled to the mounting portion 42, thereby enhancing the strength of the portion on which the cooling system, such as the radiator 61, is mounted, and it is possible to enhance the strength of the portion by changing the thickness of the brackets 81.

At this time, a rounding operation is performed around the coupling hole 43 formed at the mounting portion 42 of the inner member 41, thereby preventing the bush, which can be used when mounting the radiator 61, from being abraded.

Meanwhile, the in-mold assembly method is applied to the coupling of the brackets and the outer member 51, which is the coupling for the two components made of steel, while the over-molding method is applied to the coupling of the brackets and the inner member 41, which is the coupling for the steel component and the plastic component, so that a welding portion is removed, thereby reducing manufacturing costs.

As is apparent from the above description, according to the present invention, there are advantageous effects in that the carrier has the brackets, each of which is coupled to the outer member made of steel by the in-mold assembly coupling, while being coupled to the inner member made of the plastic material by the over-molding method, thereby reducing the overall weight of the carrier and enhancing the coupling strength of the bracket with the cooling system.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A carrier structure, comprising:
    an inner member made of plastic material, the inner member having a plurality of mounting portions protruding laterally therefrom at a lower lateral portion of the inner member to define a coupling hole configured to mount a cooling system at the lower lateral portion of the inner member; and
    an outer member made of steel, the outer member having an upper support and a plurality of lateral supports extending downwardly from either side of the upper support, wherein the upper support of the outer member is configured wired to be coupled to an upper lateral portion of the inner member, and each of the lateral supports is provided with a bracket protruding laterally therefrom at a lower end thereof and configured to be coupled to respective mounting portions.

2. The carrier structure as set forth in claim 1, wherein the bracket is coupled to the mounting portion by an overmolding method.

3. The carrier structure as set forth in claim 1, wherein the bracket is coupled to the mounting portion by an in-mold assembly method.

4. The carrier structure as set forth in claim 1, wherein the bracket is provided with a plurality of coupling holes therein.

5. The carrier structure as set forth in claim 4, wherein each coupling hole of the bracket comprises:

a plurality of lateral support coupling holes to couple the bracket to the lateral support; and a plurality of inner member coupling holes to couple the bracket to the inner member.

* * * * *

UNITED STATES PATENT AND TRADEMARK OFFICE
CERTIFICATE OF CORRECTION

PATENT NO. : 7,287,613 B2  
APPLICATION NO. : 11/039829  
DATED : October 30, 2007  
INVENTOR(S) : M. Kim Page 1 of 1

It is certified that error appears in the above-identified patent and that said Letters Patent is hereby corrected as shown below:

On the cover page, (74), Attorney, Agent or Firm, "Berstein" should read --Bernstein--.

In Column 5, Line 2 (claim 1, line 13) of the printed patent, delete "wired"

Signed and Sealed this

First Day of July, 2008

JON W. DUDAS  
*Director of the United States Patent and Trademark Office*